July 2, 1963 W. SHOCKLEY 3,096,262

METHOD OF MAKING THIN SLICES OF SEMICONDUCTIVE MATERIAL

Filed Oct. 23, 1958

WILLIAM SHOCKLEY
*INVENTOR.*

BY

Flehr and Swain
ATTORNEYS

United States Patent Office 3,096,262

Patented July 2, 1963

3,096,262
METHOD OF MAKING THIN SLICES OF SEMICONDUCTIVE MATERIAL

William Shockley, 23466 Corta Via, Los Altos, Calif.

Filed Oct. 23, 1958, Ser. No. 769,193
12 Claims. (Cl. 204—143)

This invention relates generally to a method of making thin uniform slices of semiconductive material.

There are many applications in the manufacture of semiconductive devices, particularly high frequency devices, where it is necessary to have relatively thin slices of material, particularly slices which have a uniform thickness.

It is a general object of the present invention to provide a method of making thin slices of semiconductive material.

It is another object of the present invention to provide a method of making slices of semiconductive material having a thickness which is controlled by diffusion into a block of semiconductive material.

It is another object of the present invention to provide a method of making thin uniform slices of semiconductive material by selectively removing material beyond a junction.

It is a further object of the present invention to provide a method of making thin slices of semiconductive material of uniform thickness by etching or electrolytic processes.

It is still a further object of the present invention to provide a method of making thin windows in thicker blocks of semiconductive material.

These and other objects of the present invention will become more clearly apparent from the following description when taken in conjunction with the accompanying drawing.

Referring to the drawing:

FIGURE 1 schematically shows the steps in one method of forming thin slices;

Figure 4:
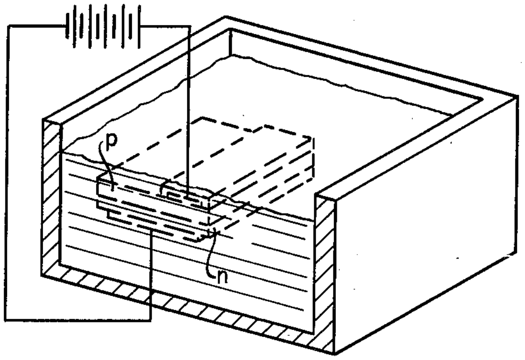
Figure 5:
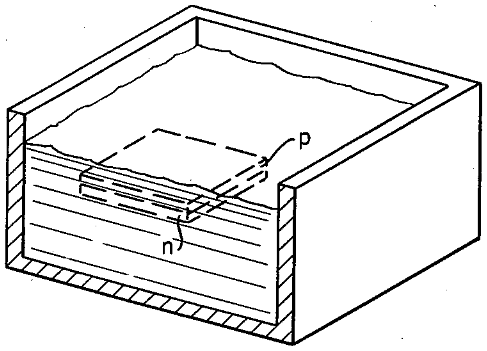
Figure 6:
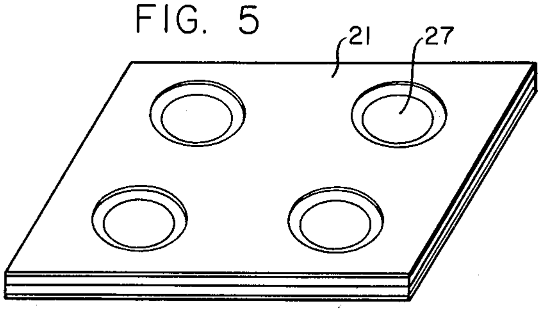

FIGURE 4 schematically shows an electrolytic bath and suitable electrical connection for forming thin slices;

FIGURE 5 schematically shows forming thin slices by immersing a starting block in etching bath; and FIGURE 6 shows thin windows formed in a thicker block of semiconductive material.

Figure 1:
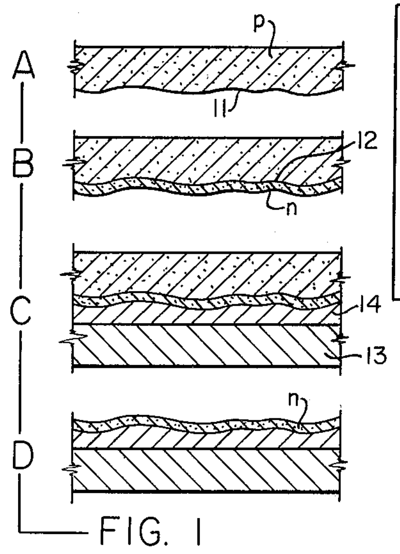

Referring to FIGURES 1A–D, a starting block of semiconductive material of one conductivity type, for example, p-type, is represented in FIGURE 1A. As is well known, regardless of the amount of polishing and etching, and the care taken, the surfaces of the block will have a certain amount of irregularity. For purposes of illustration, the roughness of the lower surface 11 of the starting block is exaggerated.

The block is suitably masked and subjected to a diffusion whereby a layer of opposite conductivity type is formed in the lower surface. Various diffusion processes are well known in the art and any such conventional process may be employed. Since the diffusion takes place uniformly into the block, the n-type diffusion layer will have a uniform thickness. The junction 12 will have a contour substantially like the contour of the lower surface. The relatively sharp edges of the lower rough surface may be somewhat smoothed out due to the diffusion. However, the general contour of the junction will be similar to the contour of surface 11. The thickness of the n-type layer will be relatively uniform.

The complete block may then be mounted on a massive silicon supporting block 13. For example, a metal such as silver or gold may be evaporated on the lower surface 11 to form a layer 14. The layer 14 is suitably secured to the massive supporting block 13.

The complete block is then subjected to a preferential process which selectively removes the p-type material beyond the junction 12. Thus, the remaining n-type layer will be a layer of relatively uniform thickness with the thickness determined by the depth of the diffusion layer.

Referring to FIGURES 4 and 5, there is schematically illustrated two methods of preferentially removing the layer beyond the junction. In FIGURE 4, an electrolytic process is illustrated, while in FIGURE 5 a selective etching process is schematically illustrated.

Patent No. 2,656,496 discloses a method for electrolytically selectively removing n-type or p-type material from a semiconductive block. In the process therein described, the surface which is made positive with respect to the electrolytic bath is selectively removed. Referring to FIGURE 4, the positive terminal of the voltage supply is attached to the p-type region and the negative terminal to the n-type region. The p-type region is preferentially removed down to the junction.

Patent No. 2,847,287 discloses a process for selectively etching p-type surface portions of a silicon body including both n-type and p-type surface portions which comprise the steps of immersing the body in an aqueous solution of hydrofluoric acid and potassium permanganate. In FIGURE 5, a block of semiconductive material is shown immersed in such a solution.

Figure 2:
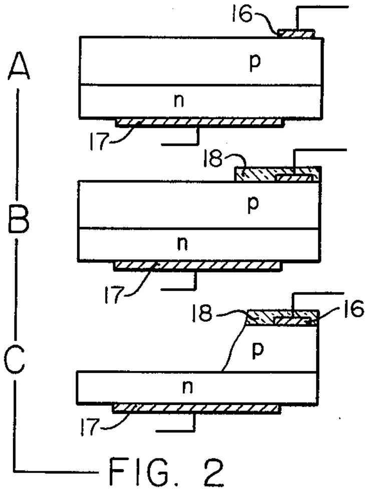
FIGURE 2 shows the steps in another method of forming thin slices.

In FIGURES 2A–C, a block of semiconductive material having p- and n-type regions is illustrated. Suitable ohmic contact 16 may be made to a small area of the p-type region, and an ohmic contact 17 may be made to the n-type region. The contact 16 may be masked 18, FIGURE 2B, to prevent electrolytic removal of the underlying p-type material. The device is then subjected to an electrolytic process to selectively remove the p-type layer. FIGURE 2C shows the resulting n-type slice which includes a p-type rib.

Figure 3:
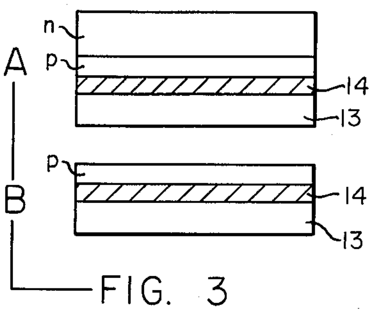
FIGURE 3 shows a method of forming thin slices of opposite conductivity type to those shown in FIGURES 1 and 2.

The device of FIGURES 3A–B is similar to that of FIGURES 1C–D and may be formed by diffusion. The selective etching is performed by reversing the polarity indicated in FIGURE 4 whereby the p-type region remains and the n-type region is selectively removed. The resulting slice is a p-type slice having a uniform thickness.

It is observed that in each instance the material beyond the junction is selectively removed thereby leaving a slice of material of one conductivity type which has a thickness defined by the depth of the junction. The layer is preferably formed by a diffusion process which can be accurately controlled as to the depth of penetration whereby very thin layers of any desired thickness may be formed. It is further observed that the layer is of uniform thickness regardless of the surface conditions of the starting block.

It should be noted that the methods disclosed herein can be utilized to form a set of thin windows in a large block or slice of material. Such a structure is represented in FIGURE 6. The block illustrated includes a relatively thick portion 21 with relatively thin windows 27. The block may include contacts 17′ and 18′ similar to the contacts 17 and 18 (FIGURE 2) as well as p- and n- type layers of semiconductor material. Such a structure is formed by selectively removing the mask where the windows are to be formed and then subjecting the wafer to a selective etching solution or to an electrolytic process, as previously described. A block including windows may be used in diffusion processes to make a multiplicity of devices in a single sequence of diffusion operations. These individual devices may subsequently be separated and mounted individually to make desired high frequency transistors, four-layer diodes or other desired semiconductor signal translating devices.

Since photocurrents produced by light absorption result in forward bias across a p-n junction (see for example, The Forty-Sixth Kelvin Lecture "Transistor Physics" by W. Shockley, Proceeding of the Institution of Radio Engineers, vol. 103, part B, No. 7, January 1956, page 34), light can be used in place of electrical connections. By this means a small isolated area of p-type material on an n-type body may be preferentially biased for removal of material beyond the junction by etching.

I claim:

1. The method of making a slice of semiconductive material of one conductivity type having a predetermined uniform thickness which comprises the steps of forming a block of semiconductor material having a first region of said one conductivity type and a second region of opposite conductivity type contiguous therewith to form a rectifying junction, said region of one conductivity type having the desired predetermined uniform thickness, and removing all the material of said opposite conductivity type, said step of removing material including preferentially dissolving material from a selected area of the face of said region of opposite conductivity type which lies opposite the junction until the material of opposite conductivity type beyond the junction in the selected area is entirely removed to leave an area of said material of said one conductivity type having said predetermined thickness.

2. A method as in claim 1 wherein the material is removed by preferential etching.

3. A method as in claim 1 wherein the preferential process is an electrolytic etching process.

4. The method of making a thin slice of semiconductive material of predetermined uniform thickness which comprises the steps of forming a layer of one conductivity type of predetermined thickness in a block of semiconductive material of opposite conductivity type to thereby define a junction in the block of material, and removing all the material of opposite conductivity type, said step of removing all the material including selectively dissolving material of opposite conductivity type from a selected area of the surface of said material of opposite conductivity type which lies opposite the junction until the material over said area beyond the junction is entirely removed to provide a selected area of material of said one conductivity type having a predetermined thickness.

5. The method of making a slice of semiconductive material of predetermined uniform thickness which comprises the steps of diffusing into a block of semiconductive material of one conductivity type a layer of opposite conductivity type defining a junction at a predetermined depth, and removing all the material of said one conductivity type beyond said junction to leave the diffusion layer of opposite conductivity type, said step of removing all the material including selectively dissolving material of opposite conductivity type from a selected area of the surface of said material of one conductivity type which lies opposite the junction until the material over said area beyond said junction is entirely removed.

6. A method as in claim 5 wherein said preferential process is a selective etching process.

7. A method as in claim 5 wherein said preferential process is an electrolytic process.

8. The method of making a sheet of semiconductive material of predetermined uniform thickness which comprises the step of forming by diffusion a layer of one conductivity type in a block of semiconductive material of opposite conductivity type to form a junction at a predetermined depth, metallically bonding the diffused layer to a supporting block, and removing all the semiconductive material of said opposite conductivity type, said step of removing all the material including selectively dissolving material of opposite conductivity type from a selected area of the surface of said material of opposite conductivity type which lies opposite the junction until the material over said area beyond the junction is entirely removed to provide a selected area of material of said one conductivity type having a predetermined thickness.

9. The method of making a slice of semiconductive material including a plurality of thin regions of predetermined thickness which comprises the steps of forming a slice of material having first and second layers of opposite conductive type which form a rectifying junction, said first layers being of said predetermined thickness, and removing all the second layer over said regions, said step of removing the second layer including preferentially dissolving the second layer beyond said junction over said regions whereby a plurality of windows of predetermined thickness are formed in said slice.

10. A method as in claim 9 wherein said material is removed by preferential etching.

11. A method as in claim 9 wherein said material is removed by a preferential electrolytic process.

12. The method of making a slice of n-type material of predetermined uniform thickness which comprises the steps of diffusing the n-type layer into a block of p-type material to form a junction, providing a positive bias of p with respect to n and removing all the p-type material, said step of removing all the p-type material including electrolytically removing from a selected area of the surface of said p-type material which lies opposite the junction until the p-type material over said area beyond the junction is entirely removed to provide a selected area of n-type material having a predetermined thickness.

References Cited in the file of this patent

UNITED STATES PATENTS

| | | |
|---|---|---|
| 2,656,496 | Sparks | Oct. 20, 1953 |
| 2,695,930 | Wallace | Nov. 30, 1954 |
| 2,847,287 | Landgren | Aug. 12, 1958 |

FOREIGN PATENTS

| | | |
|---|---|---|
| 829,191 | Germany | Jan. 24, 1952 |

OTHER REFERENCES

Bell System Tech. Journal, vol. 35, March 1956, pp. 333–347.